(12) United States Patent
Wojtowicz

(10) Patent No.: US 8,989,590 B2
(45) Date of Patent: Mar. 24, 2015

(54) PLUGGABLE OLT IN ETHERNET PASSIVE OPTICAL NETWORKS

(75) Inventor: Jaroslaw Wojtowicz, Petaluma, CA (US)

(73) Assignee: Broadcom Corporation, Irvine, CA (US)

(*) Notice: Subject to any disclaimer, the term of this patent is extended or adjusted under 35 U.S.C. 154(b) by 540 days.

(21) Appl. No.: 12/692,338

(22) Filed: Jan. 22, 2010

(65) Prior Publication Data

US 2011/0182588 A1    Jul. 28, 2011

(51) Int. Cl.
| | |
|---|---|
| *H04B 10/00* | (2013.01) |
| *H04B 10/08* | (2006.01) |
| *H04B 10/04* | (2006.01) |
| *H04B 10/40* | (2013.01) |
| *H04Q 11/00* | (2006.01) |
| *H04L 12/24* | (2006.01) |

(52) U.S. Cl.
CPC ........... *H04B 10/40* (2013.01); *H04Q 11/0067* (2013.01); *H04L 41/04* (2013.01)
USPC ............. 398/139; 398/138; 398/135; 398/42; 398/66

(58) Field of Classification Search
USPC .............................. 398/66, 42, 138, 135, 139
See application file for complete search history.

(56) References Cited

U.S. PATENT DOCUMENTS

| | | | |
|---|---|---|---|
| 6,351,582 B1* | 2/2002 | Dyke et al. ....................... 385/24 |
| 7,637,672 B1 | 12/2009 | Li et al. | |
| 8,004,961 B1* | 8/2011 | Buchanan et al. ............ 370/216 |
| 2002/0021662 A1* | 2/2002 | Heyningen et al. ........... 370/219 |
| 2003/0137975 A1* | 7/2003 | Song et al. ..................... 370/353 |
| 2004/0213256 A1* | 10/2004 | Muys et al. ................... 370/395.1 |
| 2005/0015535 A1* | 1/2005 | Lindsay et al. ............... 710/306 |
| 2005/0019036 A1* | 1/2005 | Soto et al. ..................... 398/135 |
| 2005/0041682 A1* | 2/2005 | Kramer ......................... 370/458 |
| 2005/0084269 A1* | 4/2005 | Dallesasse et al. ........... 398/135 |
| 2005/0147410 A1* | 7/2005 | Smith ............................... 398/5 |
| 2006/0018322 A1* | 1/2006 | Oron ........................... 370/395.1 |
| 2006/0039390 A1* | 2/2006 | Boyd et al. .................... 370/404 |
| 2006/0171714 A1* | 8/2006 | Dove ............................... 398/71 |
| 2007/0019957 A1* | 1/2007 | Kim et al. ........................ 398/72 |

(Continued)

FOREIGN PATENT DOCUMENTS

CN            101296525 A  * 10/2008

OTHER PUBLICATIONS

Kwon ["AC Coupled Burst-Mode OLT SFP Transceiver for Gigabit Ethernet PON Systems" IEEE 2005].*

(Continued)

*Primary Examiner* — Oommen Jacob
(74) *Attorney, Agent, or Firm* — Sterne, Kessler, Goldstein & Fox P.L.L.C.

(57) ABSTRACT

One embodiment provides a pluggable optical line terminal (OLT). The OLT includes a bi-directional optical transceiver configured to transmit optical signals to and receive optical signals from a number of optical network units (ONUs), an OLT chip coupled to the optical transceiver and configured to communicate with the ONUs through the optical transceiver, and a pluggable interface coupled to the OLT chip and configured to electrically interface between the OLT chip and a piece of network equipment. The optical transceiver, the OLT chip, and the pluggable interface are contained in an enclosure complying with a form factor, thereby allowing the pluggable OLT to be directly plugged into the network equipment.

26 Claims, 5 Drawing Sheets

(56) References Cited

U.S. PATENT DOCUMENTS

| | | | |
|---|---|---|---|
| 2007/0064719 A1* | 3/2007 | Tanaka | 370/437 |
| 2007/0153823 A1* | 7/2007 | Wojtowicz | 370/463 |
| 2007/0201487 A1* | 8/2007 | Lin et al. | 370/395.51 |
| 2007/0268818 A1* | 11/2007 | Sugihara | 370/216 |
| 2008/0025724 A1* | 1/2008 | Ozaki | 398/68 |
| 2008/0069564 A1* | 3/2008 | Bernard | 398/72 |
| 2008/0089693 A1* | 4/2008 | El-Ahmadi et al. | 398/135 |
| 2008/0095541 A1 | 4/2008 | Dallesasse | |
| 2008/0131135 A1* | 6/2008 | Dugan | 398/135 |
| 2008/0198857 A1* | 8/2008 | Kim et al. | 370/401 |
| 2008/0267628 A1* | 10/2008 | Li et al. | 398/79 |
| 2008/0279105 A1* | 11/2008 | Absillis et al. | 370/236.2 |
| 2008/0298803 A1* | 12/2008 | Warner et al. | 398/43 |
| 2009/0161689 A1* | 6/2009 | Hinderthuer et al. | 370/463 |
| 2009/0304384 A1* | 12/2009 | Li | 398/58 |
| 2009/0324237 A1* | 12/2009 | Pan et al. | 398/135 |
| 2010/0098412 A1* | 4/2010 | Boyd et al. | 398/25 |
| 2010/0138584 A1* | 6/2010 | Lindsay et al. | 710/313 |
| 2010/0189433 A1* | 7/2010 | Trojer | 398/8 |
| 2010/0239252 A1* | 9/2010 | Davis et al. | 398/58 |
| 2010/0254706 A1* | 10/2010 | Hirth et al. | 398/48 |
| 2011/0142443 A1* | 6/2011 | Hirth et al. | 398/25 |
| 2011/0182588 A1* | 7/2011 | Wojtowicz | 398/139 |

OTHER PUBLICATIONS

CN101296525 English Translation.*

Wei-Ping Huang et al: "Optical Transceivers for Fiber-to-the-Premises Applications: System Requirements and Enabling Technologies", Journal of Lightwave Technology, IEEE Service Center, New York, NY, US, vol. 25, No. 1, Jan. 1, 2007, pp. 11-27.

Hashimoto T et al: "A bidirectional single fiber 1.25 Gb/s optical transceiver module with SFP package using PLC", 2003 Proceedings 53rd. Electronic Components and Technology Conference. (ECTC). New Orleans, LA, May 27-30, 2003; [Proceedings of the Electronic Components and Technology Conference], New York, NY IEEE, US, vol. Conf. 53, May 27, 2003, pp. 279-283.

European Search Report issued May 19, 2011 for Appl. No. EP 11000186, 8 pages.

English-Language Abstract for Chinese Patent Publication No. 101296525 A, published Oct. 29, 2008; 1 page.

First Office Action directed to related Chinese Patent Application No. 201110025760.4, mailed Mar. 27, 2013; 8 pages.

* cited by examiner

PLUGGABLE OLT IN ETHERNET PASSIVE OPTICAL NETWORKS

BACKGROUND

1. Field

The present disclosure relates to the design of Ethernet passive optical networks (EPONs). More specifically, the present disclosure relates to the design of a pluggable optical line terminal (OLT).

2. Related Art

In order to keep pace with increasing Internet traffic, network operators have widely deployed optical fibers and optical transmission equipment, substantially increasing the capacity of backbone networks. A corresponding increase in access network capacity is also needed to meet the increasing bandwidth demand of end users for triple play services, including Internet protocol (IP) video, high-speed data, and packet voice. Even with broadband solutions, such as digital subscriber line (DSL) and cable modem (CM), the limited bandwidth offered by current access networks still presents a severe bottleneck in delivering large bandwidth to end users.

Among different competing technologies, passive optical networks (PONs) are one of the best candidates for next-generation access networks. With the large bandwidth of optical fibers, PONs can accommodate broadband voice, data, and video traffic simultaneously. Such integrated service is difficult to provide with DSL or CM technology. Furthermore, PONs can be built with existing protocols, such as Ethernet and ATM, which facilitate interoperability between PONs and other network equipment.

Typically, PONs are used in the "first mile" of the network, which provides connectivity between the service provider's central offices and the premises of the customers. The "first mile" is generally a logical point-to-multipoint network, where a central office serves a number of customers. For example, a PON can adopt a tree topology, wherein one trunk fiber couples the central office to a passive optical splitter/combiner. Through a number of branch fibers, the passive optical splitter/combiner divides and distributes downstream optical signals to customers and combines upstream optical signals from customers (see FIG. 1). Note that other topologies are also possible, including ring and mesh topologies.

Transmissions within a PON are typically performed between an optical line terminal (OLT) and optical network units (ONUs). The OLT controls channel connection, management, and maintenance, and generally resides in the central office. The OLT provides an interface between the PON and a metro backbone, which can be an external network belonging to, for example, an Internet service provider (ISP) or a local exchange carrier. For EPON, such interface is an Ethernet interface. The ONU terminates the PON and presents the native service interfaces to the end users, and can reside in the customer premise and couples to the customer's network through a customer-premises equipment (CPE).

FIG. 1 illustrates a passive optical network including a central office and a number of customers coupled through optical fibers and a passive optical splitter (prior art). A passive optical splitter 102 and optical fibers couple the customers to a central office 101. Multiple splitters can also be cascaded to provide the desired split ratio and a greater geographical coverage. Passive optical splitter 102 can reside near end-user locations to minimize the initial fiber deployment costs. Central office 101 can couple to an external network 103, such as a metropolitan area network operated by an ISP. Although FIG. 1 illustrates a tree topology, a PON can also be based on other topologies, such as a logical ring or a logical bus. Note that, although in this disclosure many examples are based on EPONs, embodiments of the present invention are not limited to EPONs and can be applied to a variety of PONs, such as ATM PONs (APONs), gigabit PONs (GPONs), and wavelength division multiplexing (WDM) PONs.

In conventional EPON configurations, at a carrier's central office, an OLT line card containing multiple OLTs can aggregate traffic from multiple downstream PONs, each communicating with an OLT. Multiple OLT line cards can be placed in a chassis to interface with the metro backbone via a backplane. To implement such a configuration, a carrier typically purchases custom-designed OLT line cards (based on the requirement of the traffic aggregation equipment and the metro backbone network) from equipment vendors. Such custom-designed OLT line cards can be expensive, and often require large amounts of capital expenditures (CAPEX) even during the initial network deployment stage. For example, each OLT line card includes a fixed number of OLT chips regardless of the number of existing subscribers. Therefore, when the number of subscribers is low, a large portion of the capacity of the OLT line card is wasted without generating revenue for the carrier. In addition, such an approach can also be cost ineffective for future upgrades as the number of subscribers increases.

SUMMARY

One embodiment provides a pluggable optical line terminal (OLT). The OLT includes a bi-directional optical transceiver configured to transmit optical signals to and receive optical signals from a number of optical network units (ONUs), an OLT chip coupled to the optical transceiver and configured to communicate with the ONUs through the optical transceiver, and a pluggable interface coupled to the OLT chip and configured to electrically interface between the OLT chip and a piece of network equipment. The optical transceiver, the OLT chip, and the pluggable interface are contained in an enclosure complying with a form factor, thereby allowing the pluggable OLT to be directly plugged into the network equipment.

In a variation on this embodiment, the network equipment is an Ethernet line card.

In a variation on this embodiment, the pluggable interface is a gigabit interface converter (GBIC) interface which can be plugged into a GBIC port on the network equipment, and the form factor is substantially the same as a GBIC transceiver.

In a variation on this embodiment, the pluggable interface is a small form-factor pluggable (SFP) interface which can be plugged into an SFP port on the network equipment, and the form factor is substantially the same as an SFP transceiver.

In a variation on this embodiment, the pluggable interface is a 10 gigabit small form factor pluggable (XFP) interface which can be plugged into an XFP port on the network equipment, and the form factor is substantially the same as an XFP transceiver.

In a variation on this embodiment, the pluggable interface is a small form-factor pluggable plus (SFP+) interface which can be plugged into an SFP+ port on the network equipment, and the form factor is substantially the same as an SFP+ transceiver.

In a variation on this embodiment, the pluggable interface is a XENPAK interface which can be plugged into a XENPAK port on the network equipment, and the form factor is substantially the same as a XENPAK transceiver.

In a variation on this embodiment, the pluggable interface is an X2 interface which can be plugged into an X2 port on the network equipment, and the form factor is substantially the same as an X2 transceiver.

In a variation on this embodiment, the bi-directional optical transceiver is a pluggable transceiver and is configured to transmit optical signals into and receive optical signals from a multi-mode or a single-mode optical fiber.

In a variation on this embodiment, the OLT further includes a power-management module configured to provide power to the OLT chip and the optical transceiver, using power delivered from the network equipment through the pluggable interface.

In a variation on this embodiment, the OLT further includes a serializer/deserializer (SERDES) module which is coupled between the pluggable interface and the OLT chip, thereby facilitating serial communication through the pluggable interface.

In a variation on this embodiment, the OLT further includes a printed circuit board (PCB). In addition, the OLT chip includes a die directly attached on the PCB without conventional chip packaging.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention (e.g., general passive optical network (PON) architectures). Thus, the present invention is not intended to be limited to the embodiments shown, but is to be accorded the widest scope consistent with the principles and features disclosed herein.

Overview

In embodiments of the present invention, the problem of the need to use custom-designed OLT line cards is solved by providing an OLT module that is pluggable to an existing off-the-shelf line card. The OLT module complies with the form factor required by the line card interface and includes an OLT chip and a pluggable interface. During operation, the OLT chip within the pluggable OLT module communicates with a number of ONUs via a bi-directional optical transceiver. The OLT chip, the pluggable interface, and the optical transceiver are contained in an enclosure that complies with a certain form factor, thus forming a pluggable OLT module. In some embodiment, the pluggable OLT module can be plugged into an input port on an off-the-shelf (OTS) Ethernet line card. Consequently, a service carrier can utilize any available OTS Ethernet line card to aggregate traffic from a number of downstream PONs instead of developing a custom-designed OLT line card.

OLT Chip Architecture

Figure 1:
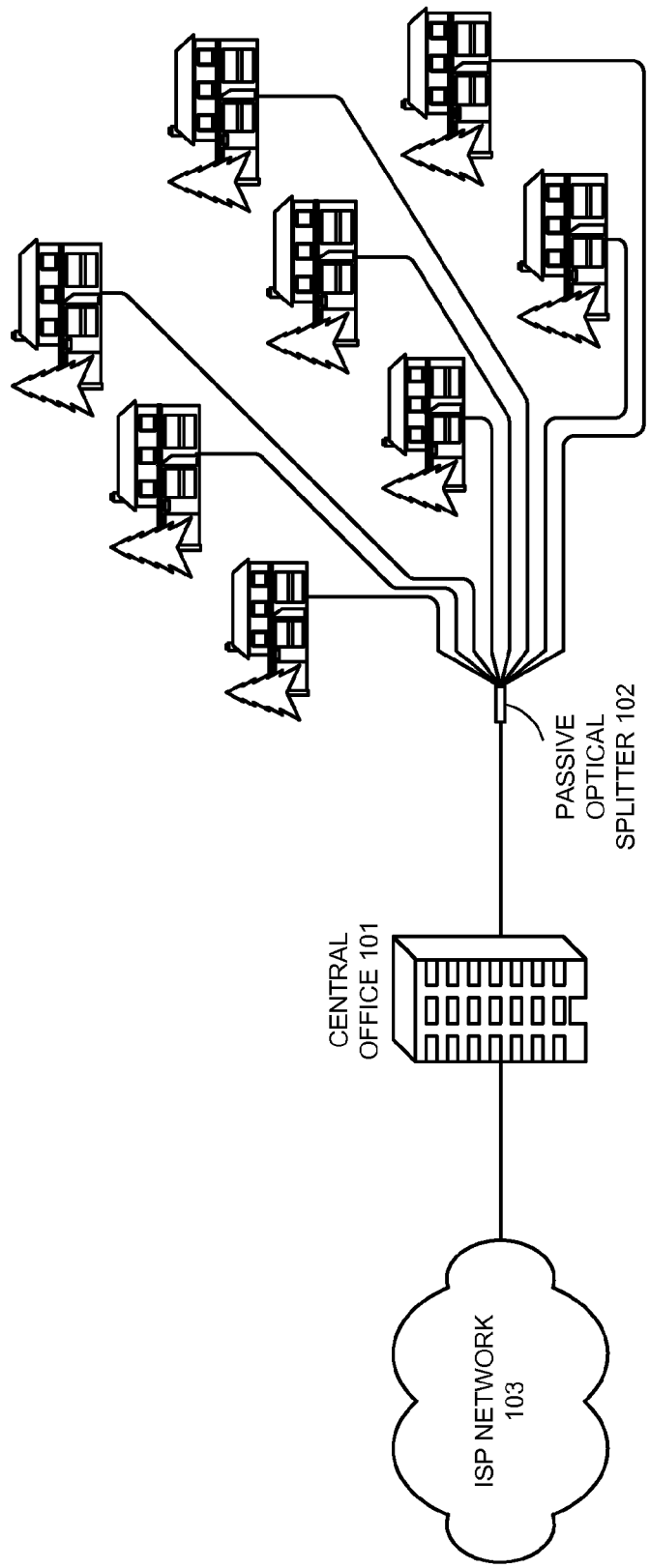
FIG. 1 illustrates an EPON wherein a central office and a number of subscribers are coupled through optical fibers and a passive optical splitter (prior art).
Figure 2:
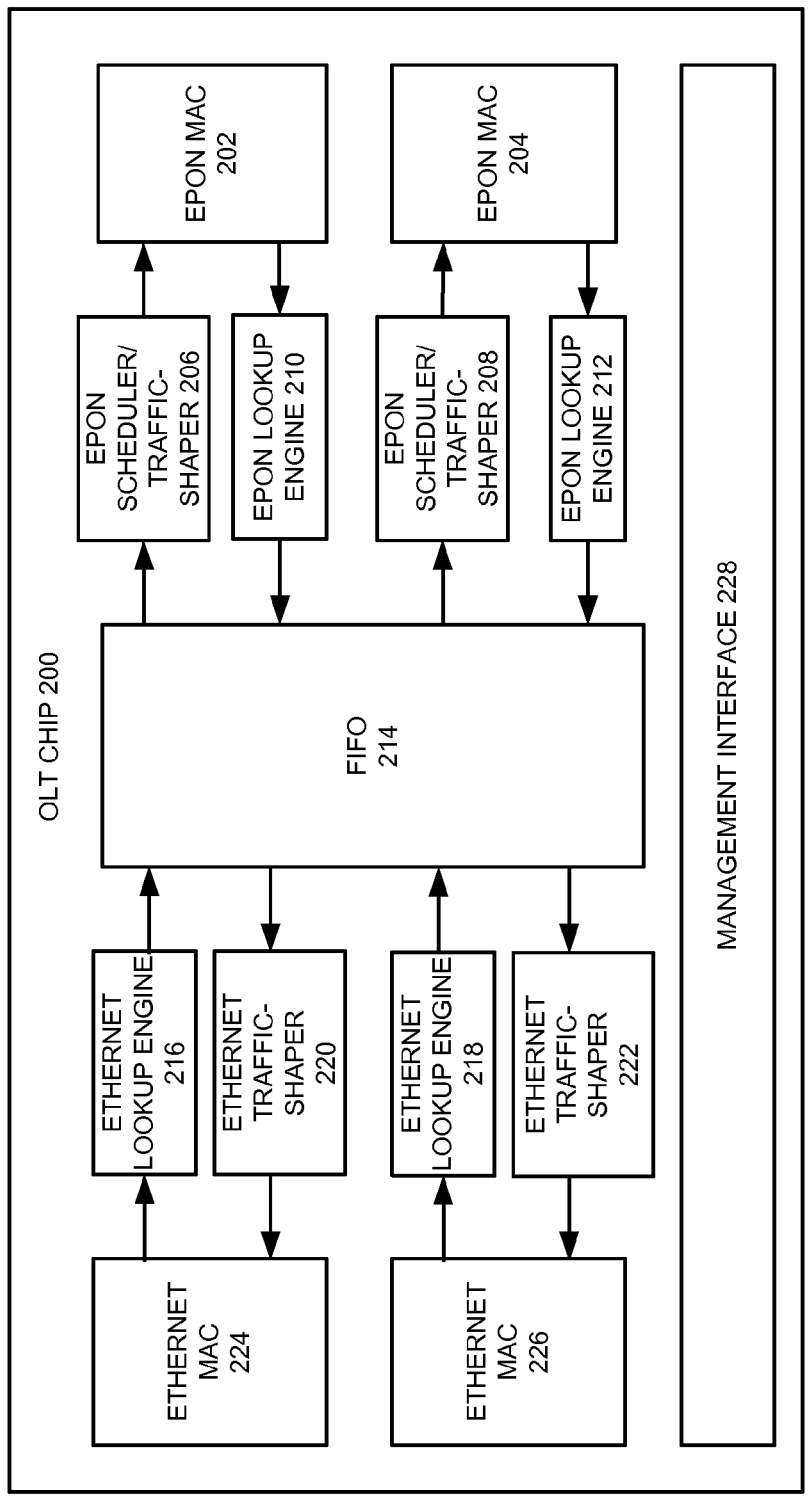
FIG. 2 presents a diagram illustrating the architecture of an exemplary dual-port OLT chip within a pluggable OLT module in accordance with an embodiment of the present invention.

FIG. 2 presents a diagram illustrating the architecture of an exemplary dual-port OLT chip within a pluggable OLT module in accordance with an embodiment of the present invention. Dual-port OLT chip 200 includes two EPON media access control (MAC) modules 202 and 204, two EPON scheduler/traffic-shaper modules 206 and 208, two EPON lookup engines 210 and 212, a first-in-first-out (FIFO) buffer 214, two Ethernet lookup engines 216 and 218, two Ethernet traffic-shaper modules 220 and 222, two Ethernet MAC modules 224 and 226, and a management interface 228.

EPON MAC modules 202 and 204 interface with downstream PONs. In the downstream direction, EPON MAC module 202 and EPON MAC module 204 broadcast Ethernet traffic to their respective PONs. In one embodiment, EPON MAC modules 202 and 204 can each operate at dual data rate. In the upstream direction, EPON MAC modules 202 and 204 perform dynamic bandwidth allocation (DBA), which is used for arbitrating upstream traffic from various ONUs. In addition, EPON MAC modules 202 and 204 also perform forward error correction (FEC) in both downstream and upstream directions.

EPON scheduler/traffic-shaper modules 206 and 208 perform downstream traffic flow control. Similarly, Ethernet traffic-shaper modules 220 and 222 perform flow control in the upstream direction. EPON lookup engines 210 and 212 and Ethernet lookup engines 216 and 218 can perform forwarding-table lookup functionalities such as determining the corresponding logical-link-identifier (LLID) in the downstream direction or virtual local area network (VLAN) ID in the upstream direction for a received packet. FIFO buffer 214 includes a number of FIFO queues corresponding to different traffic priorities. A received packet can be stored in a corresponding FIFO queue based on the lookup result. For example, in the downstream direction the system can maintain separate FIFO queues for unicast traffic, multicast traffic, and broadcast traffic.

Ethernet MAC modules 224 and 226 couple to the service provider's network via a number of interfaces, including but not limited to: Media Independent Interface (MII), Gigabit MII (GMII), 10 Gigabit MII (XGMII), and 10 Bit parallel Interface (TBI). Management interface 228 includes an embedded microprocessor that enables PON management and control.

Note that each dual-port OLT chip 200 can support two downstream PONs. In one embodiment, dual-port OLT chip 200 communicates with the downstream PONs via optical transceivers. In the upstream direction, each port of the dual-port OLT chip 200 is coupled to a serializer/deserializer (SERDES), which provides a digital interface between OLT chip 200 and the service provider's network. In addition to optical transceivers and SERDES, external memories, such as synchronous dynamic random access memory (SDRAM) and flash memory, can also be used to support packet buffering and PON management.

The OLT chip and other supporting components, including a module that manages and supplies power, can be placed in a pizza-box type physical enclosure to form an OLT module.

However, in the carrier's central office, where space is precious, it is desirable to place multiple OLT chips on a single line card, which can be plugged into a chassis. Such an approach enables the carrier's ability to support large numbers of subscribers using cost-effective equipments. Because currently no standard OLT line cards exist, carriers often need to purchase custom-designed OLT line cards from equipment vendors. These custom-designed OLT line cards can be expensive. In addition, because the number of OLT chips on a custom-designed OLT line card is fixed, this solution is less economical during the initial network deployment stage when the subscriber number is low.

To overcome aforementioned issues, in embodiments of the present invention, OLT chip 200 illustrated in FIG. 2 is enclosed in a pluggable OLT module which can be directly plugged into a standard off-the-shelf Ethernet line card with a standard interface. This solution can significantly reduce the CAPEX costs since the OTS Ethernet line card is much cheaper than a custom-designed OLT line card. In addition, when the number of subscribers is low, the carrier can choose to leave a number of ports on the Ethernet line card vacant, thus further reducing equipment costs during initial EPON deployment. The carrier can install more pluggable OLT modules as the number of subscribers increases. Consequently, this approach provides a "pay-as-you-grow" solution for service providers.

Pluggable OLT

Figure 3:
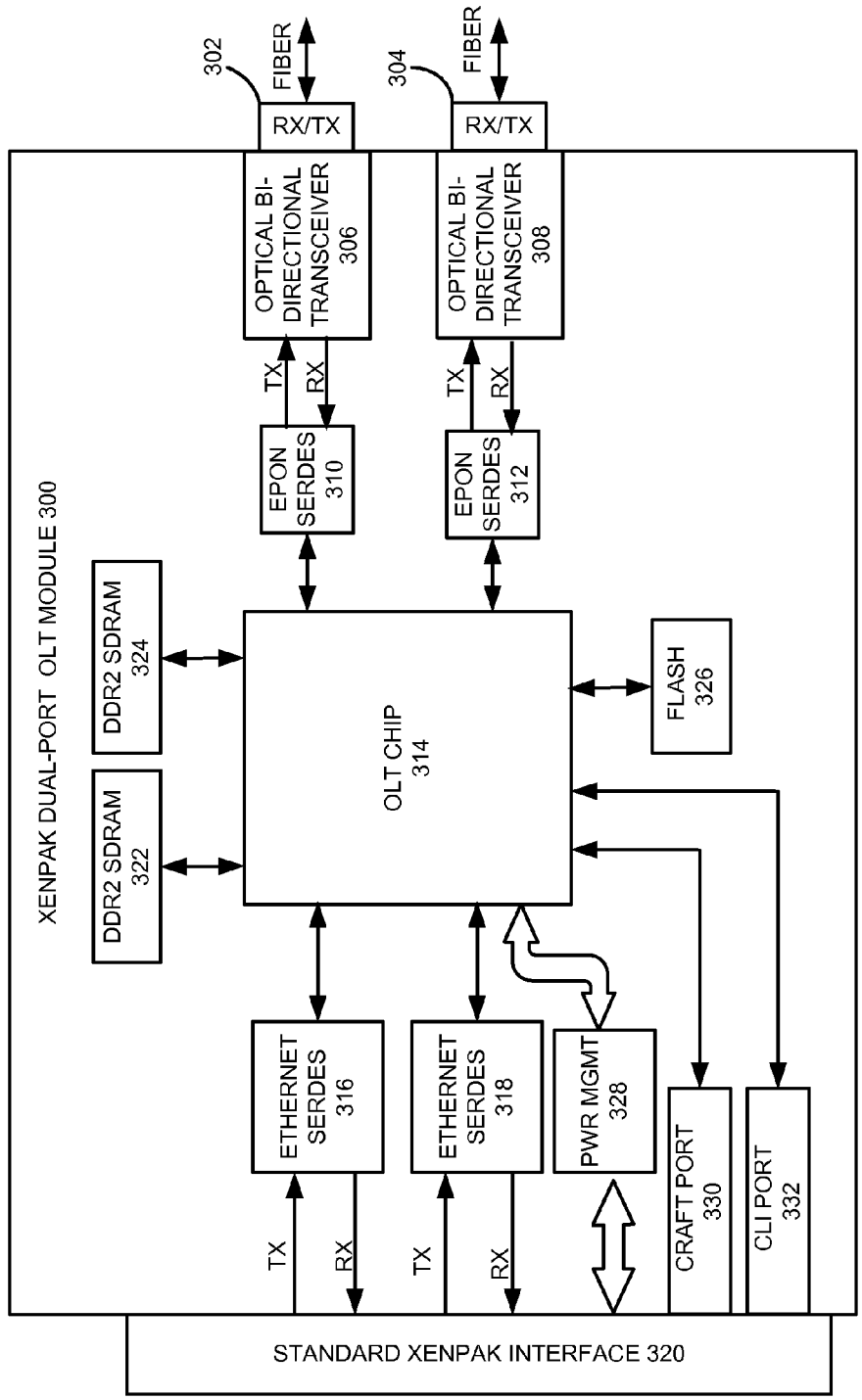
FIG. 3 presents a diagram illustrating the architecture of an exemplary pluggable dual-port OLT module with a XENPAK form factor in accordance with an embodiment of the present invention

FIG. 3 presents a diagram illustrating the architecture of an exemplary pluggable dual-port OLT module with a XENPAK form factor in accordance with an embodiment of the present invention. Note that XENPAK is standard for transceivers which are compatible with 10 Gigabit Ethernet standard (IEEE standard 802.3). XENPAK defines a hot-swappable electrical interface and can support a wide range of physical media, including multi-mode and single-mode optical fibers and copper cables. Transmission distances vary from 100 meters to 80 kilometers for optical fiber and up to 15 meters for copper cable. The specification of the XENPAK standard can be obtained at the website of the small form factor (SFF) committee (http://www.sffcommittee.com/ie/Specifications.html).

In FIG. 3, a XENPAK dual-port OLT module 300 includes fiber connectors 302 and 304 for coupling to optical fibers on the plant side, i.e., the EPON fibers. Through connectors 302 and 304, optical bi-directional transceivers 306 and 308 transmit optical signals to and receive signals from the optical fibers. Note that both transceivers are capable of simultaneously transmitting and receiving. For example, transceiver 306 can transmit a downstream signal to and receive an upstream signal from the same fiber, wherein the two signals are on different wavelengths, and wherein the fiber can be a single-mode or multi-mode fiber. In a further embodiment, optical transceivers 306 and 308 can be pluggable transceivers, such as small form-factor pluggable (SFP) transceivers or 10 gigabit SFP (XFP) transceivers. The specifications of SFP standard and XFP standard can also be found at the website of the SFF committee.

Each optical transceiver is further coupled to a corresponding EPON SERDES, through a transmission (TX) link and a receiving (RX) link. For example, transceiver 306 is coupled to EPON SERDES 310. In the upstream direction, an EPON SERDES, such as SERDES 310, deserializes the PON signals received by a corresponding optical transceiver before sending the deserialized signals to an OLT chip 314 for processing. OLT chip 314 has a similar configuration as the OLT chip shown in FIG. 2. Note that EPON SERDES 310 and EPON SERDES 312 are coupled to corresponding EPON MAC modules located on OLT chip 314.

In addition to EPON SERDES 310 and EPON SERDES 312 for serializing/deserializing PON signals, XENPAK dual-port OLT module 300 also includes an Ethernet SERDES 316 and an Ethernet SERDES 318, which provide a high-speed serial interface between the OLT chip and the carrier's network. In the downstream direction, an Ethernet SERDES, such as SERDES 316, deserializes network signals received from the carrier's network before sending the deserialized network signals to OLT chip 314 for processing. Note that Ethernet SERDES 316 and Ethernet SERDES 318 are coupled to corresponding Ethernet MAC modules located on OLT chip 314. XENPAK dual-port OLT module 300 includes a standard XENPAK interface 320, which provides serial communication channels between OLT chip 314 and a corresponding Ethernet line card.

Also included in XENPAK dual-port OLT module 300 are a number of synchronous dynamic random access memories (SDRAM), such as double data rate (DDR2) SDRAMs 322 and 324, a flash memory 326, a power management module 328, a craft port 330, and a command line interface (CLI) port 332. DDR2 SDRAMs 322 and 324 are coupled to the FIFO buffer located on OLT chip 314, thus extending the packet buffering capacity of the FIFO buffer in both the upstream and downstream directions. Flash memory 326 is coupled to the management interface of OLT chip 314, and supports the network management and control operation of the embedded processor. Power management module 328 draws power from XENPAK interface 320 and provides power for the rest of XENPAK dual-port OLT module 300, including OLT chip 314. Craft port 330 and CLI port 332 are both coupled to the management interface of OLT chip 314, thus enabling various user management functionalities, including remote out-of-band management by a network administrator.

In one embodiment, the integrated circuits, such as the OLT chip, SERDES modules, flash memory, and the power management modules, can be directly attached to the underlying printed circuit board (PCB) without individual packaging. That is, an IC die can be attached directly to a PCB, and conductive wires are bonded to the IC connectors and conductive regions on the PCB. The die is typically covered with a blob of epoxy.

The connection interface between a pluggable OLT module and the Ethernet line card can be based on any open-standard or proprietary format. In one embodiment, the OLT module complies with the XENPAK standard. In addition to XENPAK, other form factors are also applicable to the inventive pluggable OLT, including, but not limited to: gigabit interface converter (GBIC), small form-factor pluggable (SFP), SFP+, 10 gigabit small form-factor pluggable (XFP), and X2. A pluggable OLT module generally can have any form factor, so long as its size allows the OLT module to be plugged into a piece of OTS network equipment located at the carrier's central office. Particularly, the pluggable OLT can have a form factor which is substantially similar to any fiber-optical transceivers. The specifications of the addition form factors are also available at the SFF committee website.

Figure 4:
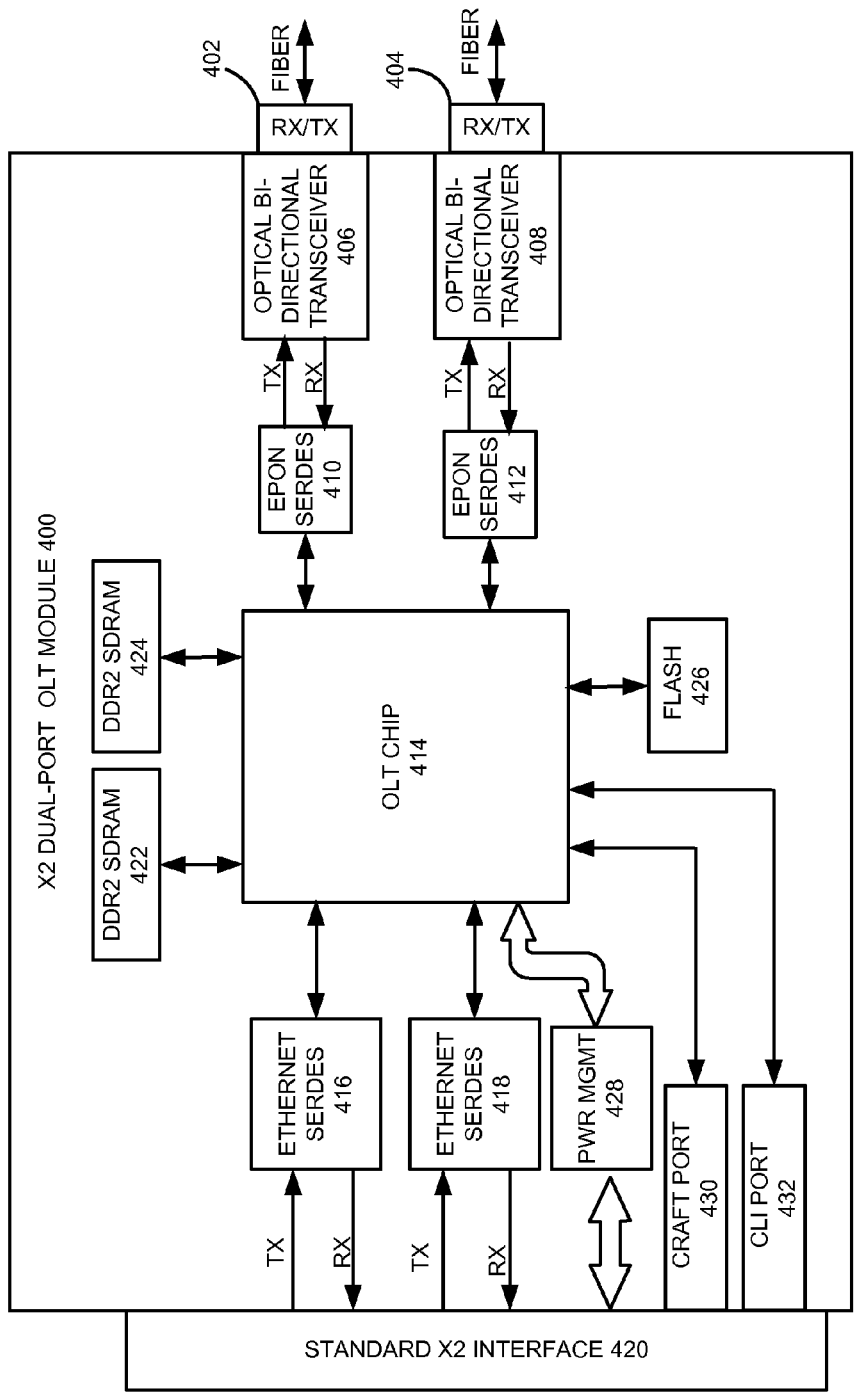
FIG. 4 presents a diagram illustrating the architecture of an exemplary pluggable dual-port OLT module with an X2 form factor in accordance with an embodiment of the present invention.

FIG. 4 presents a diagram illustrating the architecture of an exemplary pluggable dual-port OLT module with an X2 form factor in accordance with an embodiment of the present invention. X2 defines a 10 GHz optical module that is slightly smaller than a XENPAK module. Similar to XENPAK dual-port OLT module 300 shown in FIG. 3, X2 dual-port OLT module 400 also includes fiber connectors 402 and 404, optical bi-directional transceivers 406 and 408, EPON SERDES 410 and EPON SERDES 412, an OLT chip 414, Ethernet SERDES 416 and Ethernet SERDES 418, DDR2 SDRAMs 422 and 424, a flash memory 426, a power module 428, a craft port 430, and a CLI port 432. However, instead of a standard XENPAK interface, X2 dual-port OLT module 400 includes a standard X2 interface 420, which provides serial communication channels between OLT chip 414 and a corresponding Ethernet line card. Note that the corresponding Ethernet line card is equipped with interfaces that are compatible with the X2 standard. Also note that, although the examples herein use Ethernet line cards as the exemplary carrier's network equipment, embodiments of the present invention can be readily applied to a variety of network equipment, such as routers, switches, crossconnects, and multiple-layer switches. In general, the inventive pluggable OLT modules can be plugged into any network equipment which provides a compatible interface.

OLT Line Card

Figure 5:
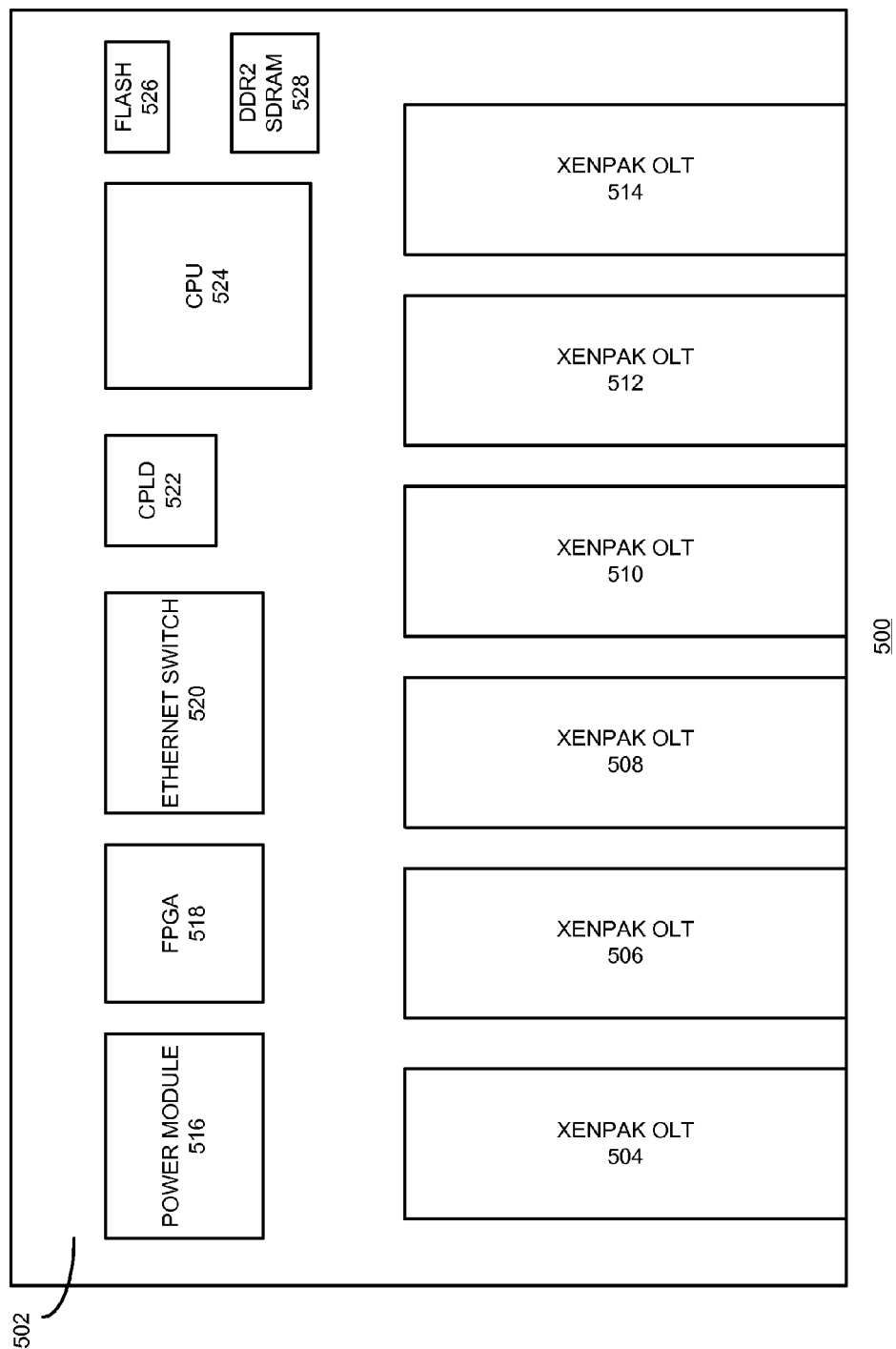
FIG. 5 presents a diagram illustrating the architecture of an exemplary OLT line card in accordance with an embodiment of the present invention.

In one embodiment, a number of pluggable OLT modules can be plugged into a standard OTS Ethernet line card to form an OLT line card. FIG. 5 presents a diagram illustrating the architecture of an exemplary OLT line card in accordance with an embodiment of the present invention. OLT line card 500 includes an OTS Ethernet line card 502 and a number of XENPAK OLT modules including XENPAK OLT modules 504-514. OTS Ethernet line card 502 can be a standard Ethernet line card fabricated by any equipment vendor. To be able to interface with XENPAK OLT modules 504-514, Ethernet line card 502 includes corresponding XENPAK interfaces and slots.

OTS Ethernet line card 502 also includes a power module 516, a field-programmable gate array (FPGA) module 518, an Ethernet switch 520, a complex programmable logic device (CPLD) module 522, a central processing unit (CPU) 524, a flash memory 526, and a DDR2 SDRAM 528.

Power module 516 receives external power and provides power to the rest of Ethernet line card 502. Ethernet switch 520 provides standard switch functionality, including aggregating traffic from all coupled Ethernet ports which are coupled to pluggable OLT modules 504-514. Programmable logic, including FPGA module 518 and CPLD module 522, enables control and management of Ethernet line card 502. CPU 524 manages local components on Ethernet line cards 502, aggregates management and control signals from OLT modules 504-514, and communicates with a routing engine located on the chassis. In one embodiment, CPU 524 configures OLT modules 504-514. Flash memory 526 stores the programs and the initial boot-up configurations for CPU 524. DDR2 SDRAM 528 can provide memory space for CPU 524 processing and/or packet buffering.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A pluggable optical line terminal (OLT), comprising:
a bi-directional optical transceiver configured to transmit optical signals to and receive optical signals from a number of optical network units (ONUs);
an OLT chip coupled to the bi-directional optical transceiver and configured to communicate with the ONUs through the bi-directional optical transceiver, the OLT chip including:
an Ethernet Passive Optical Network (EPON) scheduler configured to perform downstream traffic flow control of information over an optical interface;
a pluggable interface coupled to the OLT chip and configured to electrically interface between the OLT chip and a piece of network equipment; and
an Ethernet serializer/deserializer (SERDES) module that is coupled between the pluggable interface and the OLT chip, configured to facilitate serial communication through the pluggable interface,
wherein the bi-directional optical transceiver, the OLT chip, the Ethernet SERDES module, and the pluggable interface are contained in an enclosure complying with a form factor, thereby allowing the pluggable OLT to be directly plugged into the piece of network equipment.

2. The OLT of claim 1, wherein the network equipment is an Ethernet line card.

3. The OLT of claim 1, wherein the pluggable interface is a gigabit interface converter (GBIC) interface which can be plugged into a GBIC port on the network equipment, and wherein the form factor is the same as a GBIC transceiver.

4. The OLT of claim 1, wherein the pluggable interface is a small form-factor pluggable (SFP) interface which can be plugged into an SFP port on the network equipment, and wherein the form-factor is the same as an SFP transceiver.

5. The OLT of claim 1, wherein the pluggable interface is a 10 gigabit small form-factor pluggable (XFP) interface which can be plugged into an XFP port on the network equipment, and wherein the form factor is the same as an XFP transceiver.

6. The OLT of claim 1, wherein the pluggable interface is a small form-factor pluggable plus (SFP+) interface which can be plugged into an SFP+ port on the network equipment, and wherein the form factor is the same as an SFP+ transceiver.

7. The OLT of claim 1, wherein the pluggable interface is a XENPAK interface which can be plugged into a XENPAK port on the network equipment, and wherein the form factor is the same as a XENPAK transceiver.

8. The OLT of claim 1, wherein the pluggable interface is an X2 interface which can be plugged into an X2 port on the network equipment, and wherein the form factor is the same as an X2 transceiver.

9. The OLT of claim 1, wherein the bi-directional optical transceiver is a pluggable transceiver and is configured to transmit optical signals to and receive optical signals from a multi-mode or a single-mode optical fiber.

10. The OLT of claim 1, further comprising a power-management module configured to provide power to the OLT chip and the bi-directional optical transceiver, using power delivered from the network equipment through the pluggable interface.

11. The OLT of claim 1, further comprising a printed circuit board (PCB), wherein the OLT chip comprises a die directly attached on the PCB without conventional chip packaging.

12. A system, comprising:
a line card;
and a pluggable optical line terminal (OLT) plugged into the line card, the OLT comprising:
a bi-directional optical transceiver configured to transmit optical signals to and receive optical signals from a number of optical network units (ONUs);
an OLT chip coupled to the bi-directional optical transceiver and configured to communicate with the ONUs through the bi-directional optical transceiver, the OLT chip including:
an Ethernet Passive Optical Network (EPON) scheduler configured to perform downstream traffic flow control of information over an optical interface;

a pluggable interface coupled to the OLT chip and configured to electrically interface between the OLT chip and the line card; and an Ethernet serializer/deserializer (SERDES) module that is coupled between the pluggable interface and the OLT chip, configured to facilitate serial communication through the pluggable interface, wherein the bi-directional optical transceiver, the OLT chip, the Ethernet SERDES module, and the pluggable interface are contained in an enclosure complying with a form factor, thereby allowing the pluggable OLT to be directly plugged into the line card.

13. The system of claim 12, wherein the line card is an Ethernet line card.

14. The system of claim 12, wherein the pluggable interface is a gigabit interface converter (GBIC) interface which can be plugged into a GBIC port on the network equipment, and wherein the form factor is the same as a GBIC transceiver.

15. The system of claim 12, wherein the pluggable interface is a small form-factor pluggable (SFP) interface which can be plugged into an SFP port on the network equipment, and wherein the form factor is the same as an SFP transceiver.

16. The system of claim 12, wherein the pluggable interface is a 10 gigabit small form-factor pluggable (XFP) interface which can be plugged into an XFP port on the network equipment, and wherein the form factor is the same as an XFP transceiver.

17. The system of claim 12, wherein the pluggable interface is a small form-factor pluggable plus (SFP+) interface which can be plugged into an SFP+ port on the network equipment, and wherein the form factor is the same as an SFP+ transceiver.

18. The system of claim 12, wherein the pluggable interface is a XENPAK interface which can be plugged into a XENPAK port on the network equipment, and wherein the form factor is the same as a XENPAK transceiver.

19. The system of claim 12, wherein the pluggable interface is an X2 interface which can be plugged into an X2 port on the network equipment, and wherein the form factor is the same as an X2 transceiver.

20. The system of claim 12, wherein the bi-directional optical transceiver is a pluggable transceiver and is configured to transmit optical signals to and receive optical signals from a multi-mode or a single-mode optical fiber.

21. The system of claim 12, wherein the OLT further comprises a power-management module configured to provide power to the OLT chip and the bi-directional optical transceiver, using power delivered from the network equipment through the pluggable interface.

22. The system of claim 12, wherein the OLT further comprises a printed circuit board (PCB); and wherein the OLT chip comprises a die directly attached on the PCB without conventional chip packaging.

23. The OLT of claim 1, further comprising an EPON SERDES coupled between the OLT chip and the bi-directional optical transceiver, the EPON SERDES configured to facilitate serial communication through the bi-directional optical transceiver.

24. The system of claim 12, further comprising an EPON SERDES coupled between the OLT chip and the bi-directional optical transceiver, the EPON SERDES configured to facilitate serial communication through the bi-directional optical transceiver.

25. A pluggable optical line terminal (OLT), comprising:
a bi-directional optical transceiver configured to transmit optical signals to and receive optical signals from a number of optical network units (ONUs);

an OLT chip coupled to the bi-directional optical transceiver and configured to communicate with the ONUs through the bi-directional optical transceiver, the OLT chip including:
an Ethernet Passive Optical Network (EPON) scheduler configured to perform downstream traffic flow control of information over an optical interface;
an uplink EPON lookup engine configured to determine virtual local area network IDs of received packets; and
a downlink EPON lookup engine configured to determine logical-link-identifiers of outgoing packets;

a pluggable interface coupled to the OLT chip and configured to electrically interface between the OLT chip and a piece of network equipment; and an Ethernet serializer/deserializer (SERDES) module that is coupled between the pluggable interface and the OLT chip, configured to facilitate serial communication through the pluggable interface, wherein the bi-directional optical transceiver, the OLT chip, the Ethernet SERDES module, and the pluggable interface are contained in an enclosure complying with a small form factor, thereby allowing the pluggable OLT to be directly plugged into the piece of network equipment.

26. The OLT of claim 1, further comprising a memory, wherein the bi-directional optical transceiver includes a first optical bi-directional transceiver and a second bi-directional transceiver.

* * * * *